(12) United States Patent
Kohler

(10) Patent No.: US 11,751,562 B1
(45) Date of Patent: Sep. 12, 2023

(54) WINCH RAISED DEER STAND TRAILER

(71) Applicant: Douglas J. Kohler, Hugo, MN (US)

(72) Inventor: Douglas J. Kohler, Hugo, MN (US)

(73) Assignee: BE-ON MOBILE BLINDS, LLC, Hugo, MN (US)

( * ) Notice: Subject to any disclaimer, the term of this patent is extended or adjusted under 35 U.S.C. 154(b) by 821 days.

(21) Appl. No.: 16/752,189

(22) Filed: Jan. 24, 2020

Related U.S. Application Data

(60) Provisional application No. 62/796,130, filed on Jan. 24, 2019.

(51) Int. Cl.
| | | |
|---|---|---|
| A01M 31/02 | (2006.01) | |
| E06C 1/39 | (2006.01) | |
| E06C 5/04 | (2006.01) | |
| B62D 63/06 | (2006.01) | |

(52) U.S. Cl.
CPC ............. A01M 31/02 (2013.01); B62D 63/06 (2013.01); E06C 1/39 (2013.01); E06C 5/04 (2013.01)

(58) Field of Classification Search
CPC .......... A01M 31/02; B62D 63/06; E06C 1/39; E06C 5/04
See application file for complete search history.

(56) References Cited

U.S. PATENT DOCUMENTS

| | | | | |
|---|---|---|---|---|
| 533,059 A | * | 1/1895 | Harthan | B66F 11/044 254/10 R |
| 1,031,818 A | * | 7/1912 | Putman | E06C 1/34 182/69.5 |
| 1,761,726 A | * | 6/1930 | Havens | B66F 11/044 182/1 |
| 3,882,964 A | * | 5/1975 | Schellenberg | B66F 11/04 182/127 |
| 5,105,908 A | * | 4/1992 | Freund | A01M 31/02 182/20 |
| 5,295,555 A | * | 3/1994 | Strange | E06C 5/04 182/127 |
| 5,409,081 A | * | 4/1995 | Reeves | E06C 1/382 182/116 |
| 6,290,023 B1 | * | 9/2001 | Martin | E06C 1/39 280/789 |
| 6,347,684 B1 | * | 2/2002 | Fath | A01M 31/02 182/127 |
| 6,523,641 B2 | * | 2/2003 | Smith | A01M 31/02 182/127 |
| 6,739,428 B1 | * | 5/2004 | Holmes | A01M 31/02 182/127 |
| 6,761,248 B1 | * | 7/2004 | Harbison | B66F 11/042 182/69.5 |
| D519,647 S | * | 4/2006 | Watson | D25/62 |

(Continued)

OTHER PUBLICATIONS

Keene Outdoors, The Original Swift Life, Retrieved from Wayback machine on Jan. 23, 2019, from https://web.archive.org/web/20190123133200/https://www.keeneoutdoors.com/.

(Continued)

*Primary Examiner* — Brian D Mattei
*Assistant Examiner* — Kathleen M. McFarland
(74) *Attorney, Agent, or Firm* — SHERRILL LAW OFFICES, PLLC

(57) ABSTRACT

A mobile quick deploy hunting stand that includes a tower mounted onto a trailer with the tower capable of being raised and lowered by a winch on the trailer.

13 Claims, 12 Drawing Sheets

(56) References Cited

U.S. PATENT DOCUMENTS

| | | | | |
|---|---|---|---|---|
| 7,055,878 B2 * | 6/2006 | Imhof | ................. | B60P 3/07 296/26.07 |
| 7,104,360 B2 * | 9/2006 | Atkins | ................. | E06C 5/04 182/69.2 |
| 7,389,854 B1 * | 6/2008 | Johnson | ................. | E06C 5/04 182/127 |
| 8,151,934 B2 * | 4/2012 | Kirby | ................. | A01M 31/02 182/127 |
| 8,424,639 B1 * | 4/2013 | Davis | ................. | E06C 1/397 182/20 |
| 8,579,082 B1 * | 11/2013 | Owens | ................. | E06C 1/397 182/127 |
| 8,708,104 B1 * | 4/2014 | Sponsler | ................. | A01M 31/02 182/136 |
| 8,777,254 B1 * | 7/2014 | Fowler | ................. | A01M 31/02 280/656 |
| 9,574,400 B2 * | 2/2017 | Cox | ................. | B60D 1/66 |
| 9,630,666 B1 * | 4/2017 | Keene | ................. | B62D 63/061 |
| 9,877,472 B2 * | 1/2018 | Ketz | ................. | E06C 1/39 |
| 9,938,734 B1 * | 4/2018 | Garis | ................. | E04G 5/067 |
| 10,064,403 B2 * | 9/2018 | Shiver | ................. | E06C 1/39 |
| 10,143,194 B2 * | 12/2018 | Rubey | ................. | A01M 31/02 |
| 10,315,901 B2 * | 6/2019 | Berkbuegler | ......... | B66F 11/04 |
| 10,633,234 B2 * | 4/2020 | Meyer | ................. | A01M 31/02 |
| 2001/0024026 A1 * | 9/2001 | Knutsson | ................. | B60P 3/1066 280/414.1 |
| 2006/0169536 A1 * | 8/2006 | Davis | ................. | E06C 5/04 182/127 |
| 2007/0029136 A1 * | 2/2007 | Kirby | ................. | A01M 31/02 182/63.1 |
| 2009/0107762 A1 * | 4/2009 | Davis | ................. | E06C 5/02 182/63.1 |
| 2012/0211304 A1 * | 8/2012 | Rubey | ................. | B66F 11/04 182/63.1 |
| 2015/0211298 A1 * | 7/2015 | Rogers | ................. | E06C 1/383 182/21 |
| 2015/0361722 A1 * | 12/2015 | Chick | ................. | E06C 7/188 182/116 |
| 2016/0198700 A1 * | 7/2016 | Collyer | ................. | E06C 7/48 182/107 |
| 2017/0156309 A1 * | 6/2017 | Muegerl | ................. | A01M 31/02 |
| 2017/0318799 A1 * | 11/2017 | Stilwell | ................. | B62B 1/262 |
| 2018/0186614 A1 * | 7/2018 | Berkbuegler | ............. | E06C 1/39 |
| 2019/0281812 A1 * | 9/2019 | Lee | ................. | E06C 7/14 |

OTHER PUBLICATIONS

Swift Lift, Swift Lift, Retrieved from Wayback machine on Feb. 6, 2019, from https://web.archive.org/web/20190206185726/https://www.theswiftlift.com/.

* cited by examiner

WINCH RAISED DEER STAND TRAILER

BACKGROUND

Hunters have long sought a portable hunting stand capable of easy transport to remote back country locations which can be quickly and easily deployed and packed, is highly stable when deployed, and provides a platform height which is both safe and effective from which to shoot.

SUMMARY OF THE INVENTION

A mobile quick deploy hunting stand that includes a trailer and a tower. The trailer has first and second longitudinal ends, first and second lateral sides, and a post proximate the first longitudinal end extending upward in a first transverse direction.

In a first embodiment, the tower is a repositionable tower mounted on the trailer, and includes (i) a platform, (ii) first and second panels, and (iii) a winch. The first panel has a first end rigidly secured to a first edge of the platform, and a second end opposite the first end engaged to the trailer proximate the first longitudinal end of the trailer for entrapped longitudinal sliding a limited longitudinal distance on the trailer and pivoting about a lateral axis. The second panel has a first end pivotally secured to a second edge of the platform opposite the first edge of the platform for pivoting about a lateral axis, and a free second end opposite the first end. The winch is mounted upon the post and has a cable wound upon a spool with a distal end of the cable secured to one of the first end of the first panel and the first edge of the platform. Driven winding of the cable onto the spool effects longitudinal sliding of the second end of the first panel away from the first longitudinal end of the trailer a limited longitudinal distance into a stop position, with continued driven winding of the cable onto the spool with the second end of the first panel in the stop position effecting pivoting of the second end of the first panel about a lateral axis so as to pivot the platform a transverse distance above the trailer and allowing the second panel to be pivoted into a locked position with the second end of the second panel secured to the trailer proximate the second longitudinal end of the trailer.

In a second embodiment the tower is a repositionable tower mounted on the trailer, and includes (i) a platform, (ii) first and second panels, and (iii) a winch. The first panel has a first end rigidly secured to a first edge of the platform, and a second end opposite the first end pivotally secured to the trailer proximate the first longitudinal end of the trailer for pivoting about a lateral axis. The second panel has a first end pivotally secured to a second edge of the platform opposite the first edge of the platform for pivoting about a lateral axis, and a free second end opposite the first end. The winch is mounted upon the post and has a cable wound upon a spool with a distal end of the cable secured to one of the first end of the first panel and the first edge of the platform. Driven winding of the cable onto the spool effects pivoting of the second end of the first panel about the lateral axis so as to pivot the platform a transverse distance above the trailer and allows the second panel to be pivoted into a locked position with the second end of the second panel secured to the trailer proximate the second longitudinal end of the trailer.

DETAILED DESCRIPTION OF A PREFERRED EMBODIMENT

Nomenclature Table

Figure 1:
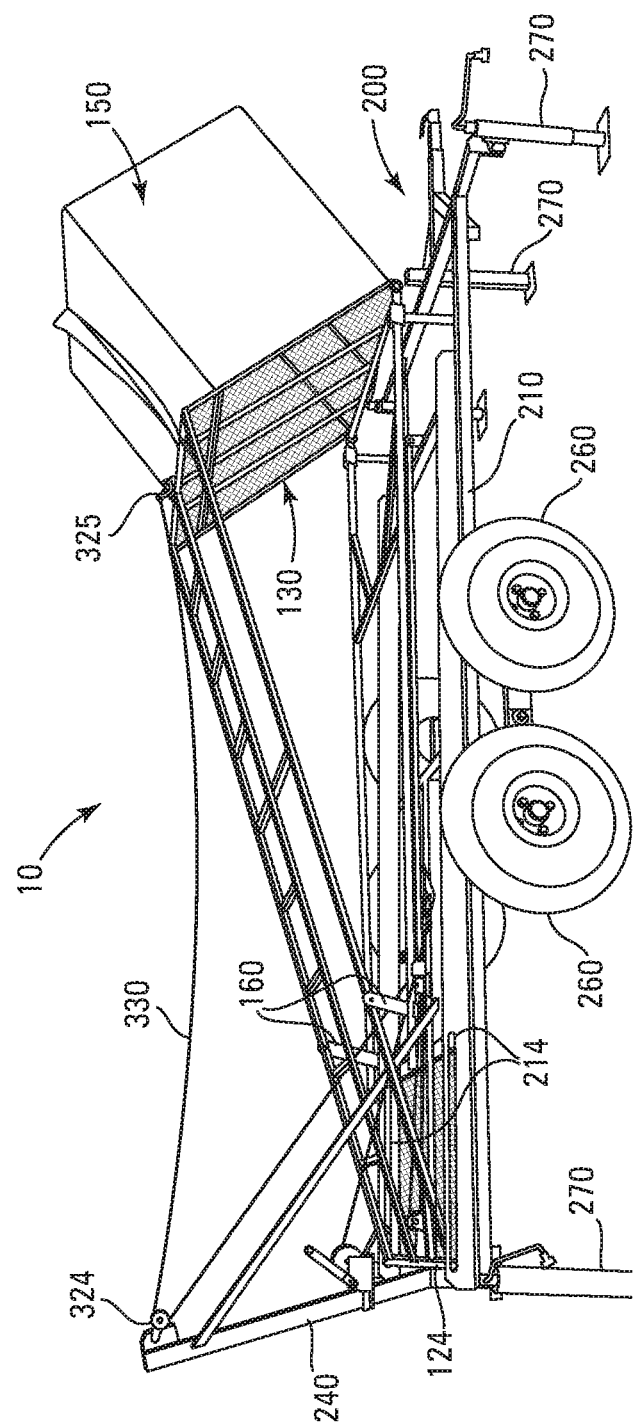
FIG. 1 is a left side perspective view of one embodiment of the invention in the lowered and rearward transport position.
Figure 2:
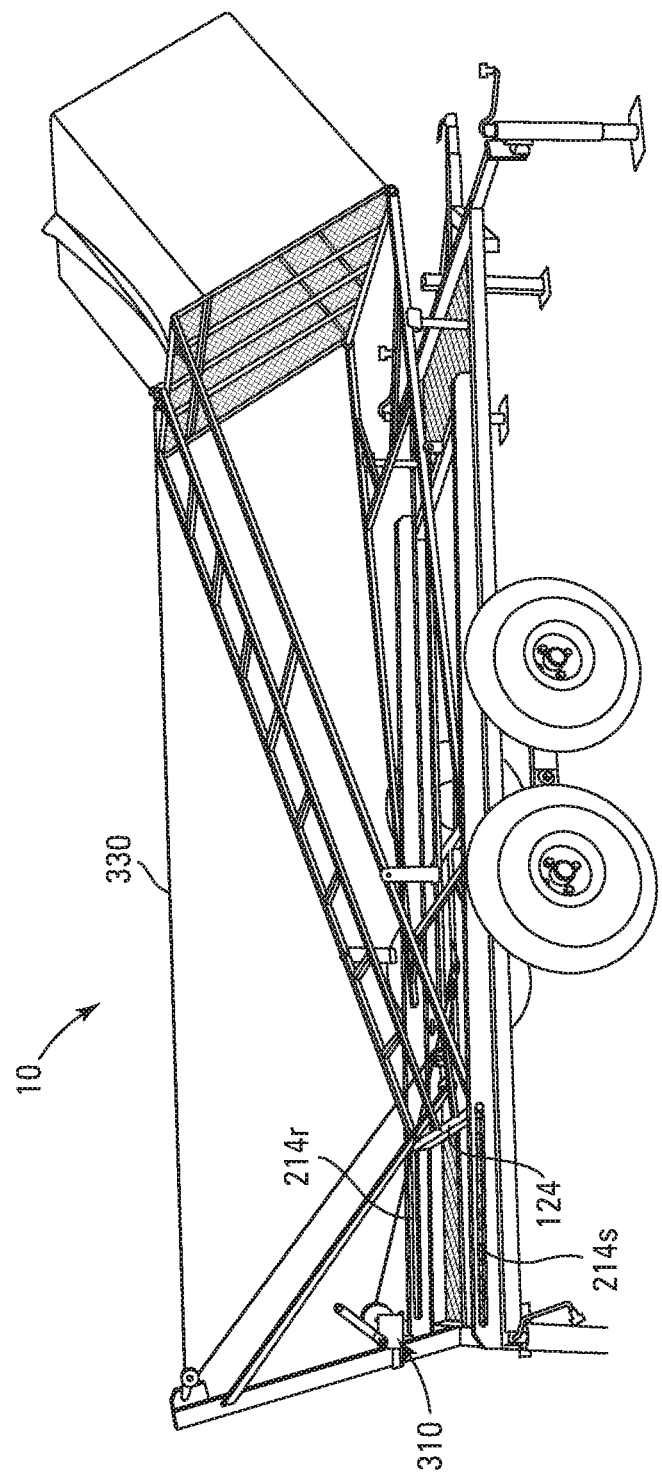
FIG. 2 is a left side perspective view of the invention depicted in FIG. 1 with the tower winched into the forward positon prior to upward pivoting of the tower.
Figure 3:
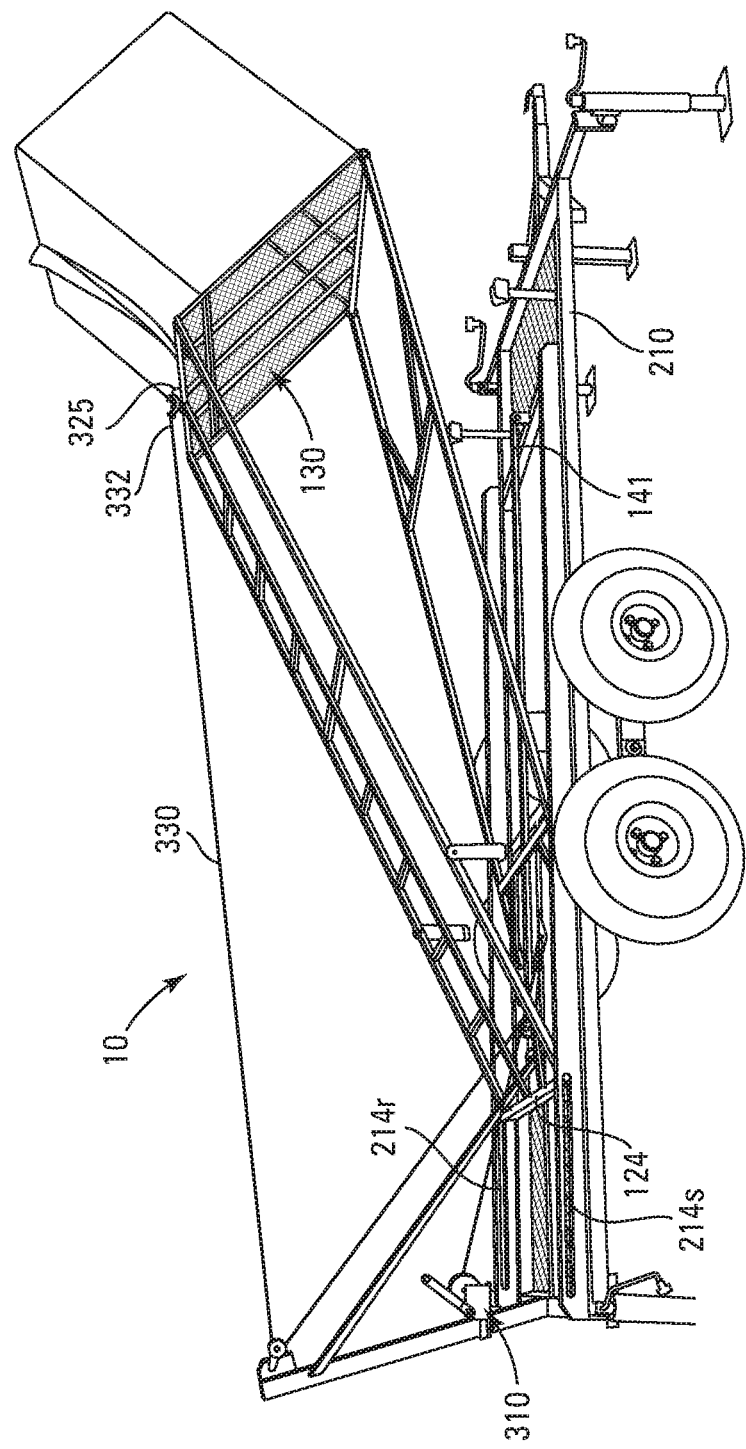
FIG. 3 is a left side perspective view of the invention depicted in FIG. 2 further winched to initiate pivoting of the tower upward.

| REF. NO. | DESCRIPTION |
|---|---|
| 10 | Winch Raised Deer Stand |
| 100 | Tower |
| 110 | Front Panel of Tower |
| 110r | Right Front Leg of Tower |
| 110s | Left Front Leg of Tower |
| 120 | Rear Panel of Tower |
| 120r | Right Rear Leg of Tower |
| 120s | Left Rear Leg of Tower |
| 122 | Ladder on Rear Panel |
| 124 | Horizontal Slider Bar at Base of Rear Panel |
| 124r | Right Side End of Horizontal Slider Bar |
| 124s | Left Side End of Horizontal Slider Bar |
| 130 | Platform |
| 131 | Front Edge of Platform |
| 132 | Rear Edge of Platform |
| 135 | Safety Railing |
| 136 | Gate |
| 140 | Stabilizing Bar |
| 141 | First End of Stabilizing Bar |
| 142 | Second End of Stabilizing Bar |
| 150 | Enclosure |
| 160 | J-Hook Supports |
| 200 | Trailer |
| 201 | Front End of Trailer |
| 202 | Rear End of Trailer |
| 210 | Trailer Chassis |
| 214 | Slider Channels on Chassis |

-continued

Nomenclature Table

| REF. NO. | DESCRIPTION |
| --- | --- |
| 214r | Right Slider Channel |
| 214s | Left Slider Channel |
| 220r | Right Side Front Leg Mounting Post |
| 220s | Left Side Front Leg Mounting Post |
| 230r | Right Side Y Stanchion |
| 230s | Left Side Y Stanchion |
| 240 | Winch Post |
| 250 | Coupler |
| 260 | Wheels |
| 270 | Outriggers |
| 300 | Winch and Pulley System |
| 310 | Spool and Handle |
| 321 | First Longitudinally Forward Pulley Attached to Trailer Chassis |
| 322 | Second Longitudinally Rearward Pulley Attached to Trailer Chassis |
| 323 | Third Longitudinally Intermediate Pulley Attached to Trailer Chassis |
| 324 | Fourth Upper Pulley Attached to Distal End of Winch Post |
| 325 | Ring on Platform or Rear Panel of Tower Proximate Platform |
| 330 | Cable |
| 331 | Proximal End of Cable |
| 332 | Distal End of Cable |
| x | Longitudinal Axis (length) |
| y | Lateral Axis (width) |
| z | Transverse Axis (height) |
| 1100 | Tower |
| 1110 | Front Panel of Tower |
| 1110r | Right Front Leg of Tower |
| 1110s | Left Front Leg of Tower |
| 1112 | Ladder on Front Panel |
| 1120 | Rear Panel of Tower |
| 1120r | Right Rear Leg of Tower |
| 1120s | Left Rear Leg of Tower |
| 1130 | Platform |
| 1131 | Front Edge of Platform |
| 1132 | Rear Edge of Platform |
| 1135 | Safety Railing |
| 1136 | Gate |
| 1140 | Stabilizing Bar |
| 1141 | First End of Stabilizing Bar |
| 1142 | Second End of Stabilizing Bar |

The hunting stand 10 is a tower 100 pivotally mounted onto the chassis 210 of a trailer 200.

Referring to FIGS. 1-12, the trailer 200 has a front end 201 equipped with a trailer hitch coupler 250, a rear end 202 equipped with a winch post 240, wheels 260, and a set of corner outriggers 270. The deck (unnumbered) of the trailer 200 preferably has a transverse height z of between 10 inches and 24 inches above grade, a longitudinal length x of between 8 feet and 15 feet, and a lateral width y of between 50 inches and 80 inches. The winch post 240 preferably extends a transverse height of 3 feet to 6 feet above grade.

Figure 4:
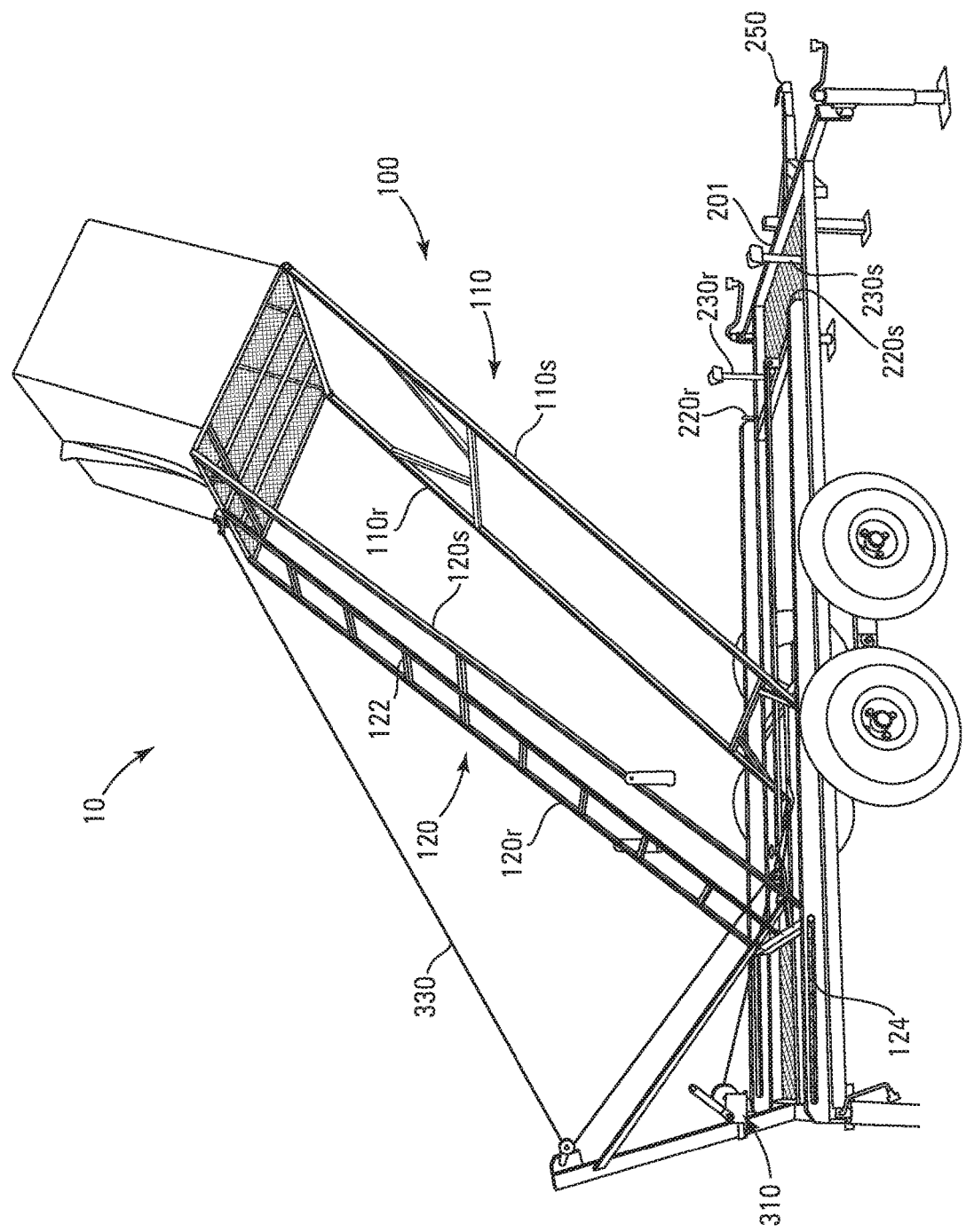
FIG. 4 is a left side perspective view of the invention depicted in FIG. 3 further winched to pivot the tower further upward.
Figure 5:
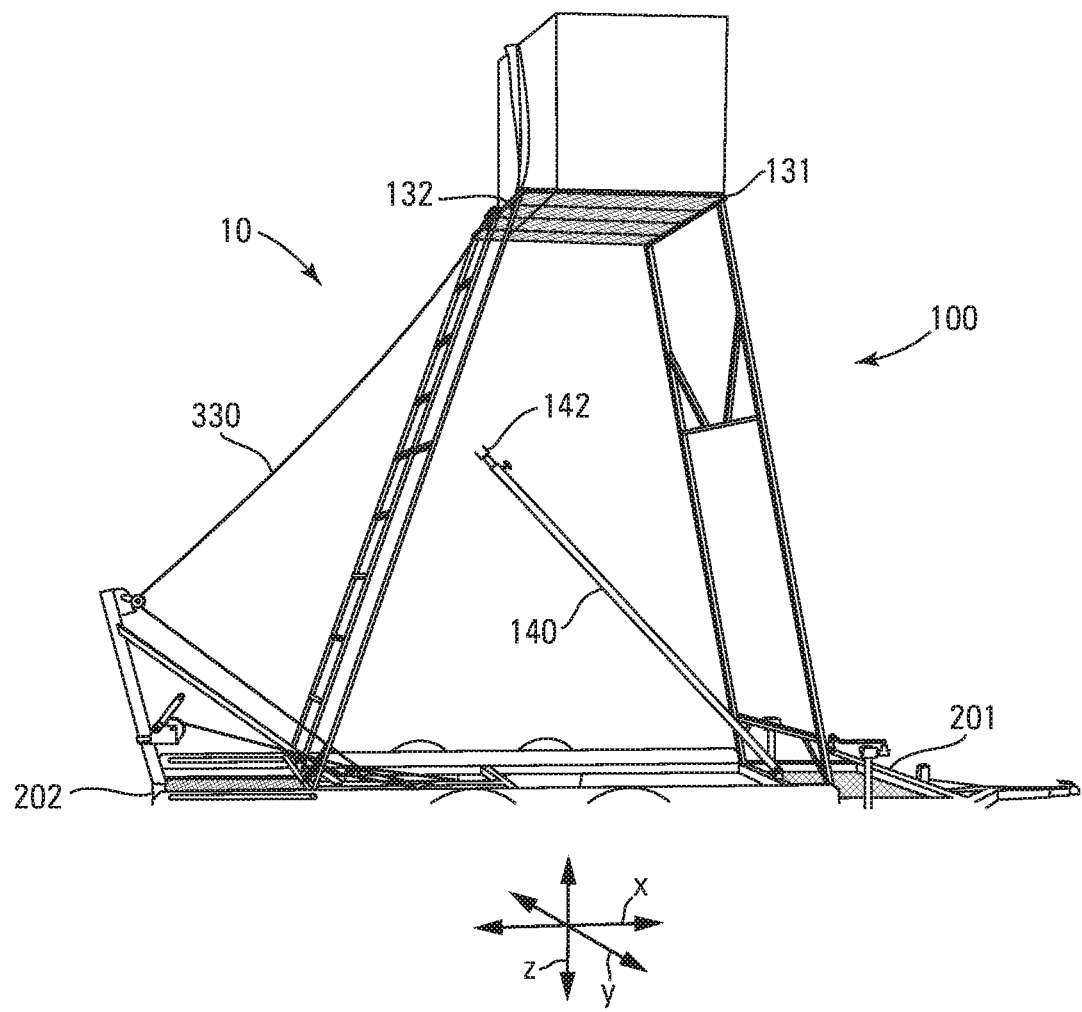
FIG. 5 is a left side perspective view of the invention depicted in FIG. 4 winched into its fully upright and erect position with the front legs mounted onto the front leg mounting posts and the stabilizing bar being pivoted into positon for stabilizing attachment to the rear panel of the tower.
Figure 6:
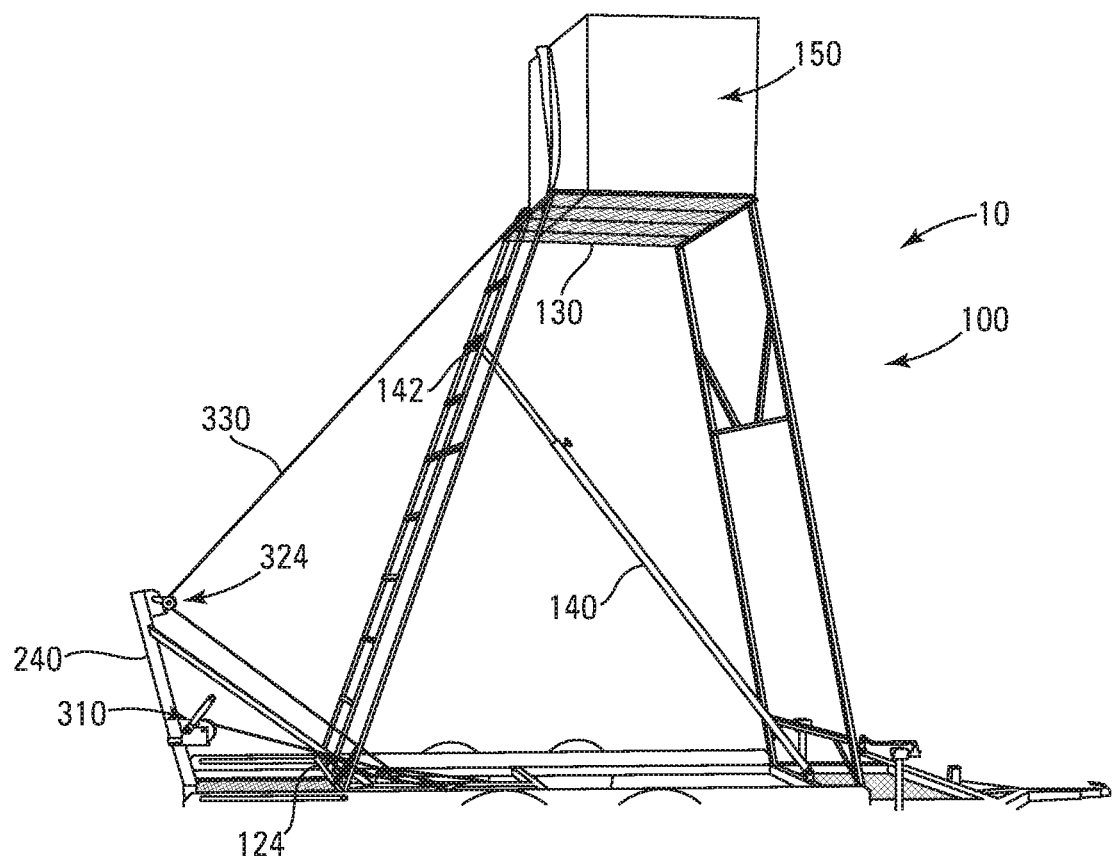
FIG. 6 is a left side perspective view of the invention depicted in FIG. 5 with the tower stabilized in the fully upright and erect position.

Referring to FIGS. 1-8, in a first embodiment a winch and pulley assembly 300 is used to raise and lower the tower 100 in the transverse z direction between a rearward lower transport position (FIG. 1) and a longitudinally x centered erect use position (FIG. 6). The spool 310 of the winch and pulley assembly 300 may be powered or hand cranked. The tower 100 is winched into a centered erect position by first horizontally pulling the tower 100 forward (FIG. 2) and then pivoting the tower 100 into the erect use position.

Referring to FIGS. 1-6, the tower 100 includes a platform 130 secured atop a front panel 110 and a rear panel 120. The platform 130 preferably has a longitudinal x length of between 3 feet and 5 feet, and a lateral y width of between 3 feet and 5 feet. Safety railings 135 are preferably provided around the periphery of the platform 130, with a locking gate 136 aligned with the ladder 122 on the rear panel 120 for facilitating ingress and egress. The front panel 110 is pivotally secured to the front edge 131 of the platform 130 and includes a right front leg 110r and a left front leg 110s interconnected with stabilizing crossbeams (unnumbered). The rear panel 120 is rigidly secured to the rear edge 132 of the platform 130 and includes a right rear leg 120r and a left rear leg 120s interconnected with stabilizing crossbeams (unnumbered). Rungs of a ladder 122 are provided on the rear panel 120 for providing ingress and egress to the platform 130. The front panel 110 and rear panel 120 each preferably have an end-to-end length of between 6 feet and 10 feet, and a lateral y width of between 3 feet and 5 feet. An optional enclosure 150 can be provided on the platform 130 for concealing a human seated on the platform 130.

Figure 7:
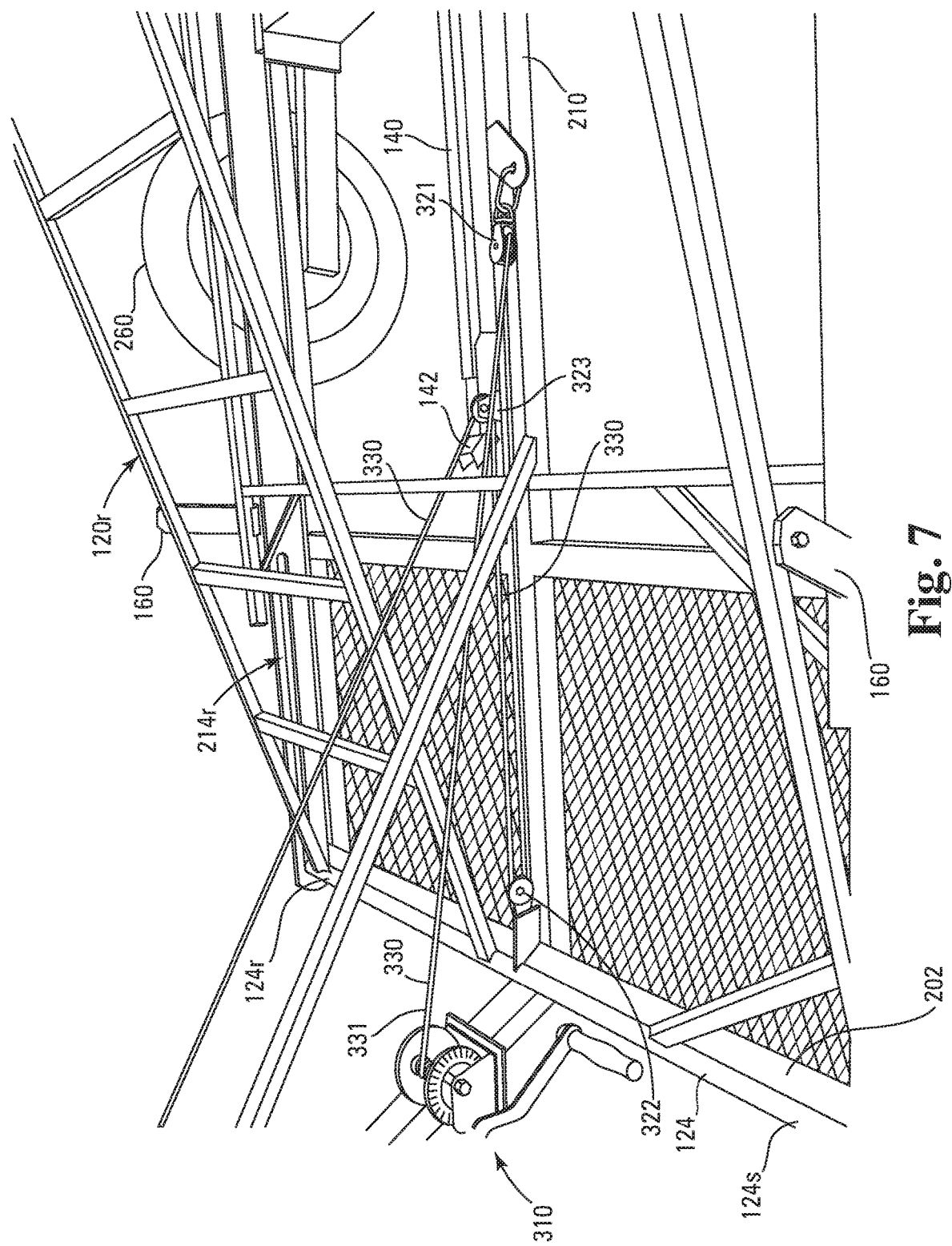
FIG. 7 is an enlarged left side view of the rear end portion of the invention depicted in FIG. 6 to facilitate viewing of the winch and pulley system.
Figure 8:
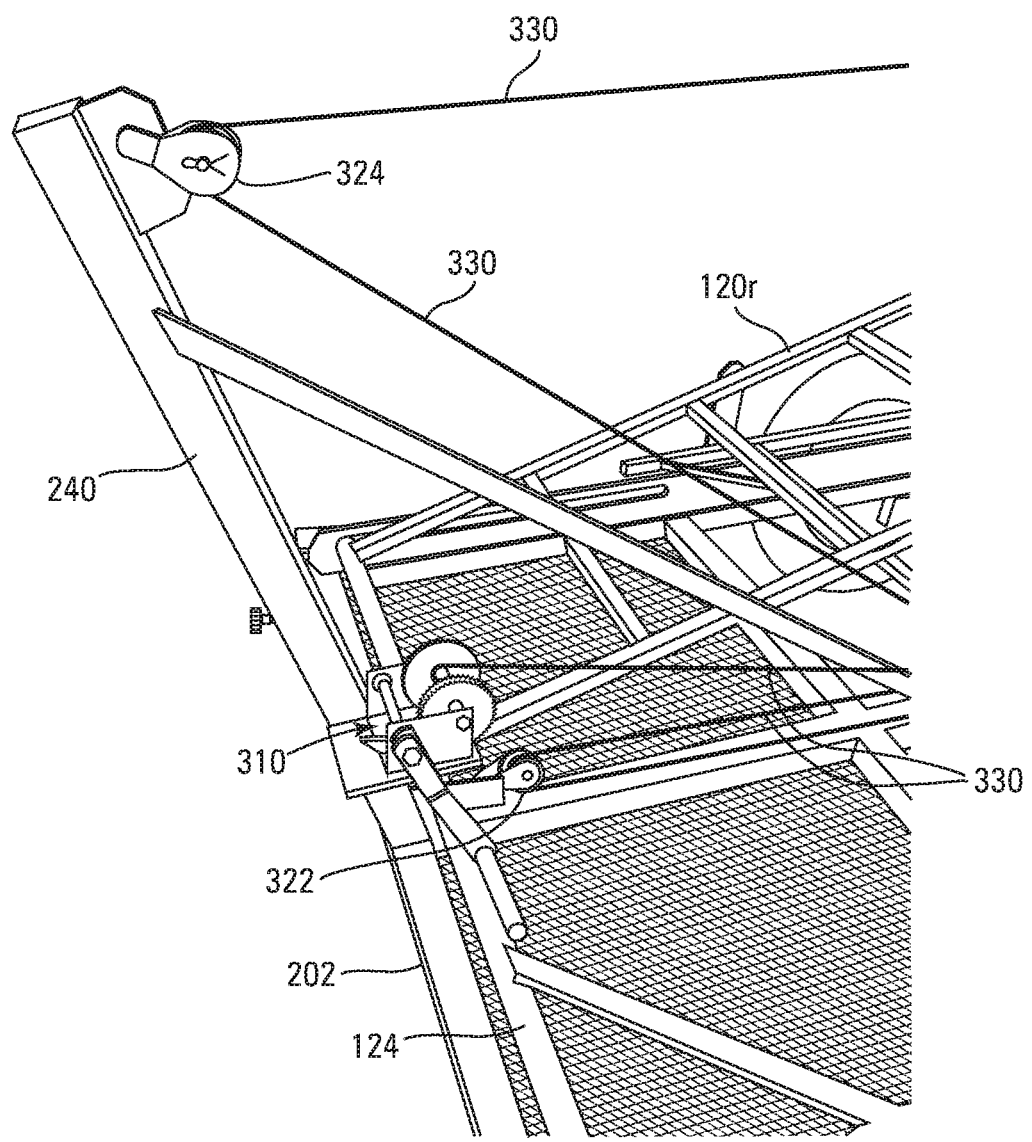
FIG. 8 is another enlarged left side view of the rear end portion of the invention depicted in FIG. 6 to facilitate viewing of the winch and pulley system.
Figure 9:
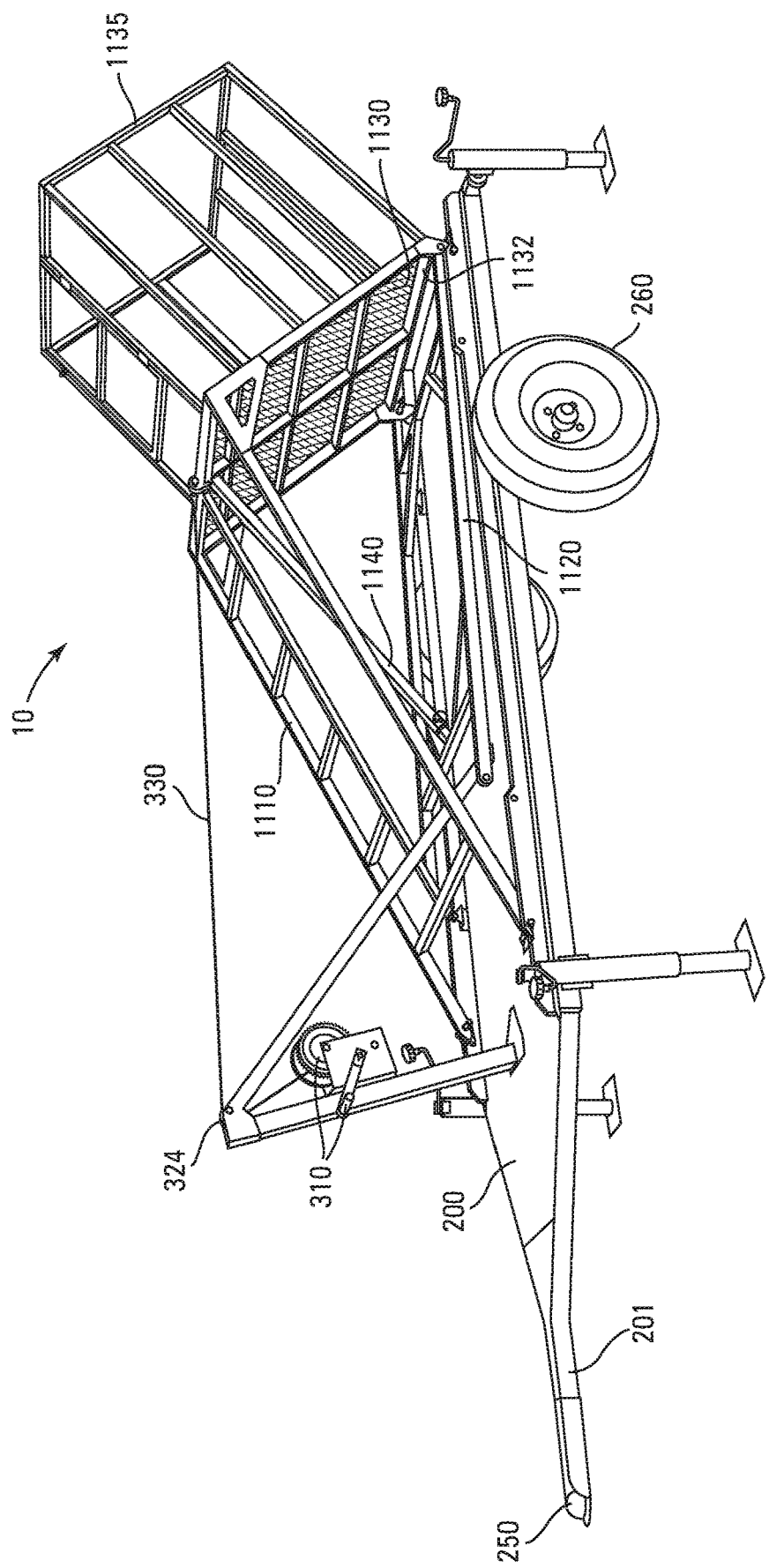
FIG. 9 is a left side perspective view of another embodiment of the invention in the lowered transport position.
Figure 10:
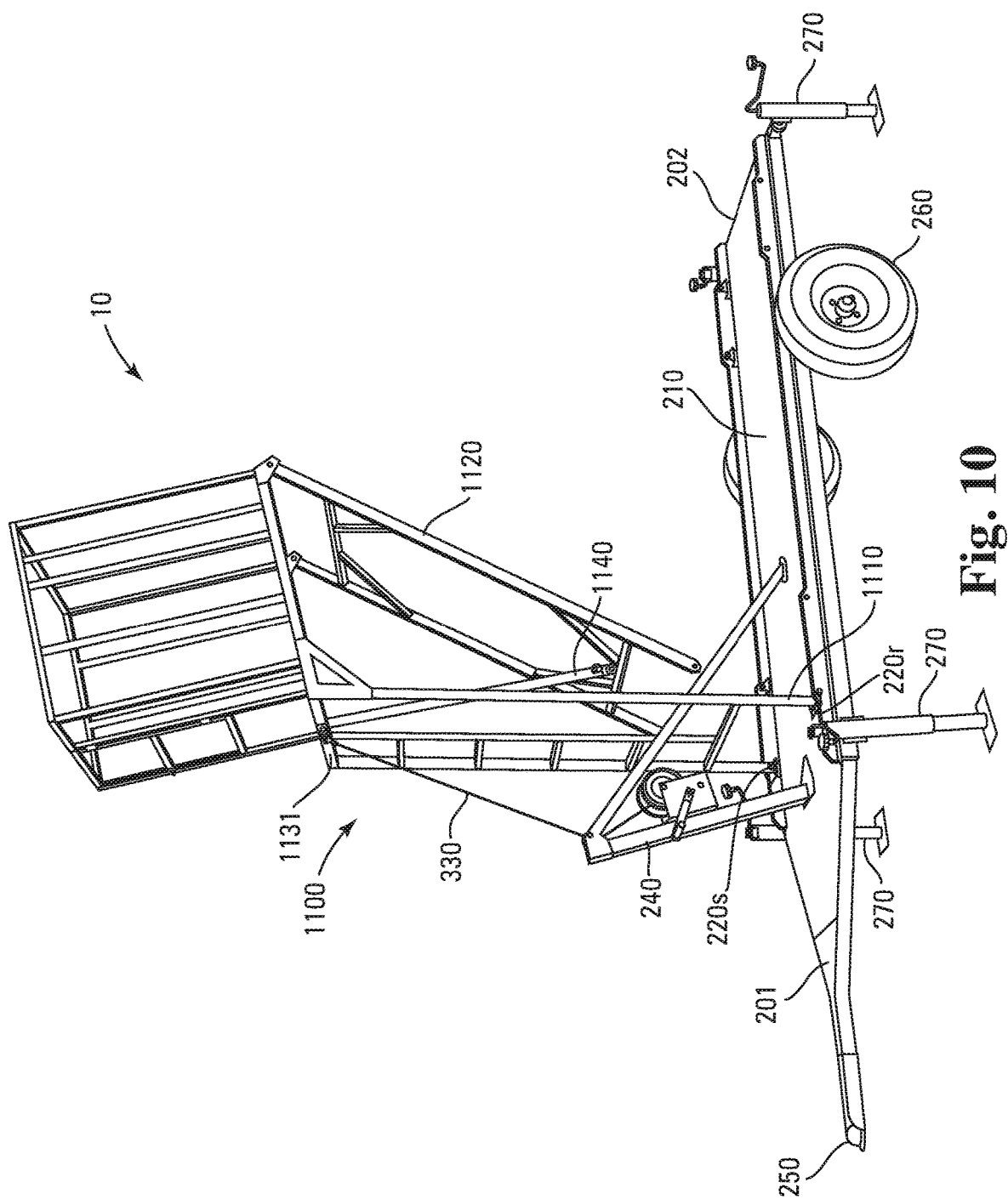
FIG. 10 is a left side perspective view of the invention depicted in FIG. 9 with the tower winched into the upright set-up position.

Referring to FIGS. 7 and 8, the bottom of the rear panel 120 has a laterally y extending horizontal slider bar 124 captured at both lateral ends 124r and 124s within slider channels 214r and 214s respectively, in the chassis 210 of the trailer 200. The slider channels 214r and 214s permit the horizontal slider bar 124 to travel a limited longitudinal x distance of between about 12 inches and 36 inches, at which point longitudinal x sliding ends and continued winching of the cable 330 effects pivoting of the horizontal slider bar 124 about a lateral y axis. The top of the rear panel 120 is rigidly attached to a rear edge 132 of a platform 130.

Referring to FIGS. 4 and 5, the top of the front panel 110 is pivotally attached to a front edge 131 of the platform 130 for pivoting about a lateral y axis. When the tower 100 is in the lowered and rearward transport position, the upper ends of the front legs 110r and 110s are supported by Y-shaped stanchions 230r and 230s extending upward from the chassis 210 of the trailer 200 and the lower ends of the front legs 110r and 110s rest upon J-hook supports 160 dangling from the rear legs 120r and 120s. When the tower 100 is in the erect position, the lower ends of the front legs 110r and 110s are secured upon mounting posts 220r and 220s extending upward from the chassis 210 of the trailer 200.

Referring to FIGS. 5 and 6, an optional stabilizing bar 140 can be included to provide additional stabilizing support for the tower 100 when the tower 100 is in the fully upright and erect position. The first end 141 of the stabilizing bar 140 is pivotally attached to the chassis 210 of the trailer 200 for pivoting about a lateral y axis. The second end 142 of the stabilizing bar 140 is configured and arranged for releasable but secure attachment to the rear panel 120 of the tower 100.

Referring to FIGS. 1-8, a cable 330 extends from a proximal end 331 attached to a spool 310 equipped with a handle 310 through a series of pulleys (321, 322, 323 and 324) attached to the chassis 210 of the trailer 200 with the distal end 332 attached via a connecting ring 325 to the upper end of the rear panel 120 or the rear edge 132 of the platform 130. The cable 330 should be laterally y offset from the ladder 122 on the rear panel 120 so as not to interfere with ingress and egress of the platform 130 using the ladder 122.

Figure 11:
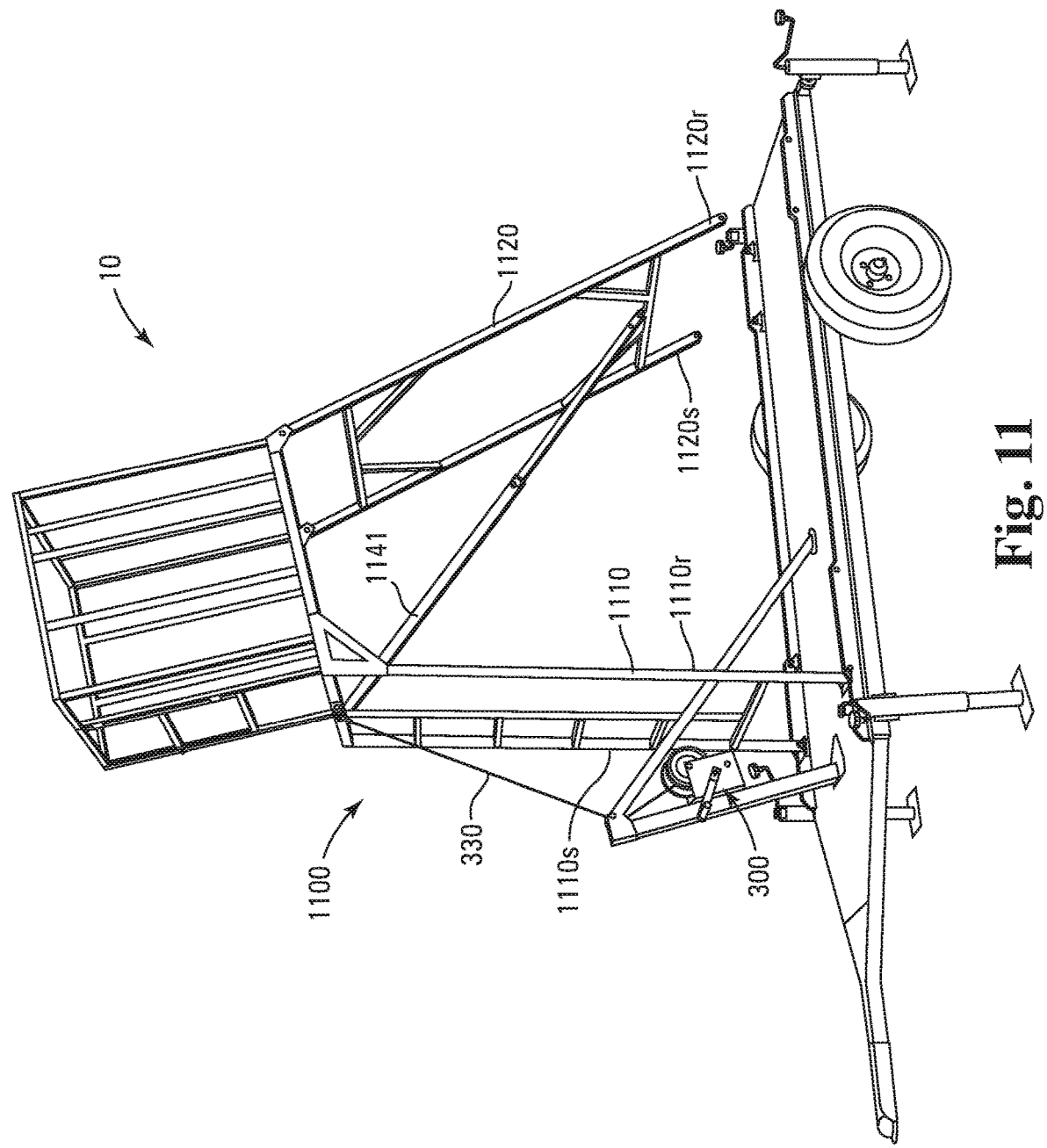
FIG. 11 is a left side perspective view of the invention depicted in FIG. 9 with the rear legs released and pivoted into the fully spread position.
Figure 12:
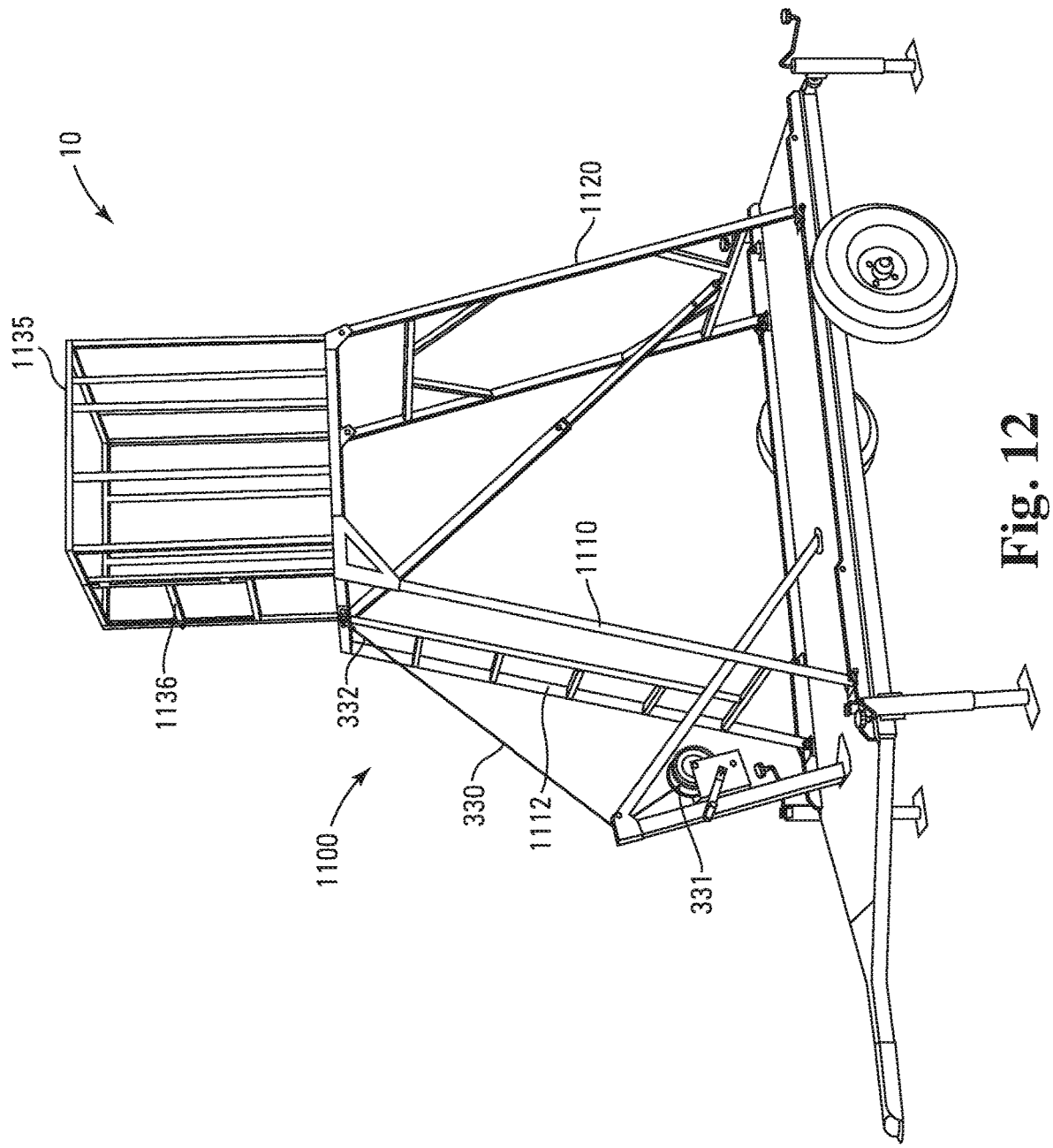
FIG. 12 is a left side perspective view of the invention depicted in FIG. 9 with the rear legs mounted onto the rear leg mounting posts.

Referring to FIGS. 9-12, in a second embodiment a winch and pulley assembly 300 that includes a spool 310, a single pulley 324 and a cable 330 is used to raise and lower the tower 1100 in the transverse z direction between a rearward lower transport position (FIG. 9) and an erect use position (FIG. 12). The spool 310 may be powered or hand cranked. Winding of the cable 330 onto the spool 310 effects erection of the tower 1100 by pivoting the bottom end of the front panel 1110 about a lateral y axis relative to the trailer 200.

Referring to FIGS. 9-12, the tower 1100 includes a platform 1130 secured atop a front panel 1110 and a rear panel 1120. The platform 1130 preferably has a longitudinal x length of between 3 feet and 5 feet, and a lateral y width of between 3 feet and 5 feet. Safety railings 1135 are preferably provided around the periphery of the platform 1130, with a locking gate 1136 aligned with the ladder 1112 on the front panel 1110 for facilitating ingress and egress. The front panel 1110 is rigidly secured to the front edge 1131 of the platform 1130 and includes a right front leg 1110r and a left front leg 1110s interconnected with stabilizing crossbeams (unnumbered). The rear panel 1120 is pivotally secured to the rear edge 1132 of the platform 1130 and includes a right rear leg 1120r and a left rear leg 1120s interconnected with stabilizing crossbeams (unnumbered). Rungs of a ladder 1112 are provided on the front panel 1110 for providing ingress and egress to the platform 1130. The front panel 1110 and rear panel 1120 each preferably have an end-to-end length of between 6 feet and 10 feet, and a lateral y width of between 3 feet and 5 feet. An optional enclosure (not shown) as depicted in connection with the first embodiment can be provided on the platform 1130 for concealing a human seated on the platform 1130.

Referring to FIGS. 9-12, the top of the front panel 1110 is rigidly attached to a front edge 1131 of the platform 1130, and the bottom of the front panel 1110 is pinned to the chassis 210 of the trailer 200 for pivoting about a lateral y axis. The top of the rear panel 1120 is pivotably attached to a rear edge 1132 of the platform 1130, with the bottom of the rear panel 1120 free to pivot during erection of the tower 1100 towards the rear end 202 of the trailer 200 for securement to the chassis 210.

Referring to FIGS. 9-12, the top of the rear panel 1120 is pivotally attached to a rear edge 1132 of the platform 1130 for pivoting about a lateral y axis. When the tower 1100 is in the lowered transport position, the rear panel 1120 is prevented from pivoting about the platform 1130 by a telescoping stabilizer bar 1140 locked into a shortened configuration with one end 1141 of the bar 1140 attached to the top of the front panel 1110 and the other end 1142 of the bar 1140 attached to the bottom of the rear panel 1120. Referring to FIG. 11, telescoping of the stabilizer bar 1140 from the shortened configuration to the telescoped elongated configuration effects pivoting of the rear panel 1120 about the platform 1130 and positions the lower end of the rear panel 1120 proximate the rear end 202 of the trailer 200 for securement to the chassis 210 of the trailer 200.

Referring to FIGS. 9-12, a cable 330 extends from a proximal end 331 attached to a spool 310 equipped with a handle 310 through a single pulley 321 attached atop the winch post 240 with the distal end 332 attached via a connecting ring 325 to the upper end of the front panel 1110 or the front edge 1131 of the platform 1130. The cable 330 should be laterally y offset from the ladder 1112 on the front panel 1110 so as not to interfere with ingress and egress of the platform 1130 using the ladder 1112.

I claim:

1. A mobile quick deploy hunting stand, comprising:
   (a) a trailer having first and second longitudinal ends, first and second lateral sides, and a post proximate the first longitudinal end extending upward in a first transverse direction and positioned between and spaced from the first and second lateral sides,
   (b) a repositionable tower on the trailer, including at least:
      (i) a platform,
      (ii) a first panel having a first end rigidly secured to a first edge of the platform, and a second end opposite the first end engaged to the trailer proximate the first longitudinal end of the trailer for entrapped longitudinal sliding a limited longitudinal distance on the trailer and pivoting about a lateral axis,
      (iii) a second panel having a first end pivotally secured to a second edge of the platform opposite the first edge of the platform for pivoting about a lateral axis, and a free second end opposite the first end, and
      (iv) a winch mounted upon the post with a cable wound upon a spool and secured at a distal end to one of the first end of the first panel and the first edge of the platform,
      (v) wherein driven winding of the cable onto the spool effects longitudinal sliding of the second end of the first panel away from the first longitudinal end of the trailer a limited longitudinal distance into a stop position, with continued driven winding of the cable onto the spool with the second end of the first panel in the stop position effecting pivoting of the second end of the first panel about a lateral axis so as to pivot the platform a transverse distance above the trailer and allowing the second panel to be pivoted into a locked position with the second end of the second panel secured to the trailer proximate the second longitudinal end of the trailer.

2. The mobile quick deploy hunting stand of claim 1 wherein the trailer has a deck and the deck has a height of between 10 inches and 24 inches above grade, a longitudinal length of between 8 feet and 15 feet, and a width of between 50 inches and 80 inches.

3. The mobile quick deploy hunting stand of claim 1 wherein the post extends a transverse height of 3 feet to 6 feet above grade.

4. The mobile quick deploy hunting stand of claim 1 wherein the platform has a length of between 3 feet and 5 feet, and a width of between 3 feet and 5 feet.

5. The mobile quick deploy hunting stand of claim 1 wherein the first panel has an end-to-end length of between 6 feet and 10 feet, and a width of between 3 feet and 5 feet.

6. The mobile quick deploy hunting stand of claim 1 wherein the second panel has an end-to-end length of between 6 feet and 10 feet, and a width of between 3 feet and 5 feet.

7. The mobile quick deploy hunting stand of claim 1 wherein the limited longitudinal distance is between 12 inches and 36 inches.

8. The mobile quick deploy hunting stand of claim 1 wherein the winch is a hand cranked winch.

9. The mobile quick deploy hunting stand of claim 1 further comprising four outriggers.

10. The mobile quick deploy hunting stand of claim 1 further comprising a ladder on the first panel for providing ingress and egress to the platform.

11. The mobile quick deploy hunting stand of claim 1 further comprising an enclosure on the platform for concealing a human seated on the platform.

12. The mobile quick deploy hunting stand of claim 1 further comprising mounting posts on the trailer proximate the second longitudinal end of the trailer configured and arranged to capture and secure the second end of the second panel onto the trailer when pivoted into the locked position.

13. The mobile quick deploy hunting stand of claim 1 further comprising pins configured and arranged for extension into aligned orifices in a lower end of the second panel and the trailer for securing the second panel to the trailer.

* * * * *